US008518367B2

(12) United States Patent
Akimoto et al.

(10) Patent No.: US 8,518,367 B2
(45) Date of Patent: Aug. 27, 2013

(54) TITANIUM OXIDE AND METHOD OF PRODUCING THE SAME

(75) Inventors: Junji Akimoto, Tsukuba (JP); Kunimitsu Kataoka, Tsukuba (JP); Akemi Kawashima, Tsukuba (JP); Hiroshi Hayakawa, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 114 days.

(21) Appl. No.: 13/130,164

(22) PCT Filed: Nov. 12, 2009

(86) PCT No.: PCT/JP2009/069247
§ 371 (c)(1),
(2), (4) Date: May 19, 2011

(87) PCT Pub. No.: WO2010/058729
PCT Pub. Date: May 27, 2010

(65) Prior Publication Data
US 2011/0223098 A1    Sep. 15, 2011

(30) Foreign Application Priority Data

Nov. 20, 2008  (JP) .................................. 2008-296628
Oct. 21, 2009  (JP) .................................. 2009-242253

(51) Int. Cl.
*C01G 25/02*  (2006.01)
*C01G 27/02*  (2006.01)
*C01B 6/24*   (2006.01)
*C01D 1/02*   (2006.01)
*C01G 23/00*  (2006.01)

(52) U.S. Cl.
USPC ....... 423/608; 423/594.15; 423/598; 423/644

(58) Field of Classification Search
USPC .................... 423/594.15, 598, 608–610, 644
See application file for complete search history.

(56) References Cited

U.S. PATENT DOCUMENTS

2010/0068625 A1    3/2010 Akimoto et al.

FOREIGN PATENT DOCUMENTS

| JP | 2007-137686 A | 6/2007 |
| JP | 2008-117625 A | 5/2008 |
| JP | 2008-255000 A | 10/2008 |
| WO | WO 2008111465 A1 * | 9/2008 |

OTHER PUBLICATIONS

Papp et al., "The influence of temperature on the structural behavior of sodium tri- and hex- titanate and their protonated forms", Journal of Solid State Chemistry 178 (2005) 1614-1619.*
Brohan et al., "Proprietes Physiques Des Bronzes MxTiO2(B)", Solid State Ionics, 9-10, 1983, pp. 419-424.
Feist et al., "The Soft Chemical Synthesis of TiO2 (B) from Layered Titanates", Journal of Solid State Chemistry, 101, 1992, pp. 275-295.

(Continued)

*Primary Examiner* — Colleen Dunn
*Assistant Examiner* — Anthony J Zimmer
(74) *Attorney, Agent, or Firm* — Birch, Stewart, Kolasch & Birch, LLP

(57) ABSTRACT

A method of producing a titanium oxide, including the steps of: ion-exchanging a sodium titanium oxide $Na_2Ti_6O_{13}$, to synthesize $Li_2Ti_6O_{13}$; subjecting $Li_2Ti_6O_{13}$ to proton exchange, to give $H_2Ti_6O_{13}$; and subjecting $H_2Ti_6O_{13}$, as a starting material, to a heat treatment.

7 Claims, 7 Drawing Sheets

(56) References Cited

OTHER PUBLICATIONS

International Search Report, dated Dec. 22, 2009 in PCT/JP2009/069247.

Takahashi et al., "Synthesis, Structural Change upon Heating, and Electronic Structure of Ramsdellite-Type TiO2", Chem. Mater, 18, 2006, pp. 748-752.

* cited by examiner

TITANIUM OXIDE AND METHOD OF PRODUCING THE SAME

TECHNICAL FIELD

The present invention relates to a titanium oxide, and a method of producing the same.

BACKGROUND ART

In recent years in Japan, nearly all of the secondary batteries installed in portable electronic devices, such as cellular phones and notebook personal computers, are lithium secondary batteries. In addition, lithium secondary batteries are also expected to be used practically in the future as large-scale batteries of hybrid electric vehicles, electrical power load-leveling systems, and the like, and their importance is continuing to increase.

These lithium secondary batteries have as major constituents thereof, a positive electrode and a negative electrode, each of which contains a material capable of reversibly inserting and extracting lithium ions, and further have a separator containing a non-aqueous electrolyte or solid electrolyte.

Among these constituents, examples of materials that have been examined for use as electrode active materials include: oxides, such as lithium cobalt oxide ($LiCoO_2$), lithium manganese oxide ($LiMn_2O_4$), and lithium titanium oxide ($Li_4Ti_5O_{12}$); metals, such as metal lithium, lithium alloy, and tin alloy; and carbon-based materials, such as graphite, and mesocarbon microbeads (MCMB).

Although the battery voltage is determined according to the difference in chemical potential between these materials at their lithium contents in the respective active materials, there is a possibility to obtain a large potential difference by a specific combination of these materials, and this is one of the characteristics of lithium secondary batteries excellent in energy density.

In particular, a combination of a lithium cobalt oxide ($LiCoO_2$) active material and a carbon material which are used for electrodes enables a voltage of nearly 4 V, while the combination realizes a large charge/discharge capacity, which corresponds to the amount of lithium able to be extracted from and inserted into an electrode, and the combination also results in a higher degree of safety. Therefore, the combination of these electrode materials is widely used in current lithium secondary batteries.

On the other hand, when combining electrodes containing a spinel-type lithium manganese oxide ($LiMn_2O_4$) active material and a spinel-type lithium titanium oxide ($Li_4Ti_5O_{12}$) active material, the lithium insertion-extraction reaction tends to occur smoothly and there are fewer changes in crystal lattice volume accompanying the reaction. Therefore, it has been identified that the resultant lithium secondary battery can be excellent in long-term charge/discharge cycle properties, and such a lithium secondary battery is developed for practical use.

Since chemical batteries, such as lithium secondary batteries and capacitors, are expected to be required to have larger size and longer life for use as electric vehicle power supplies, large-capacity backup power supplies, and emergency power supplies, electrode active materials offering even higher performance (higher capacity) have come to be required by combining oxide active materials like those described above.

Among these, since titanium oxide-based active materials exhibits a voltage of about 1 to 2 V in the case of using metal lithium for the counter electrode, studies have been conducted on materials having various crystal structures regarding their potential for use as electrode active materials in negative electrode materials.

In particular, titanium dioxide active materials having a sodium bronze-type crystal structure (herein, "titanium dioxides having a sodium bronze type-crystal structure" are abbreviated as "$TiO_2$ (B)"), which can achieve a smooth lithium insertion/extraction reaction comparable to that of spinel-type lithium titanium oxide, while realizing a higher capacity than spinel types, are attracting attention as electrode materials (see Non-Patent Literature 1).

Among these, a method of producing $TiO_2$ (B) has been clearly determined in which $H_2Ti_3O_7$ is used as a starting material, and has been clearly demonstrated to enable the synthesis of an electrode material having $TiO_2$ (B) as a main component thereof by heating in the air at a temperature of 400° C. or higher (see Patent Literature 1).

However, when $TiO_2$(B) is used in an electrode, the irreversible capacity of the initial cycle is large, and there is a problem with the use of $TiO_2$(B) as a negative electrode material in high capacity lithium secondary batteries.

On the other hand, it is clearly shown that $H_2Ti_{12}O_{25}$ is generated by a heat treatment in a lower temperature region, such as 150° C. to 280° C., in the production process which uses $H_2Ti_3O_7$ as a starting material (Patent Literature 2).

When this $H_2Ti_{12}O_{25}$ is used in an electrode, the irreversible capacity in the initial cycle is small, and a high capacity of greater than 200 mAh/g can be attained. Therefore, the $H_2Ti_{12}O_{25}$ is expected to be useful as a high capacity oxide negative electrode material.

However, in a production method using the $H_2Ti_3O_7$ as a starting material, a plurality of quasi-stable phases occur as a result of a heat treatment at from 150° C. to 500° C. Therefore, for the production of $H_2Ti_{12}O_{25}$ and $TiO_2$(B), precise temperature control is required, and it poses a problem to adopt the production method as a production process in an industrial scale (see Patent Literature 2, and Non-Patent Literature 2).

It is known that the crystal structures of these titanium oxides have similar tunnel structures. Among them, $H_2Ti_{12}O_{25}$ has a $Na_2Ti_{12}O_{25}$ type tunnel structure, and as shown in FIG. 1, $H_2Ti_{12}O_{25}$ is characterized by having a crystal structure having two types of tunnel spaces with different sizes, due to the skeletal structure established by $TiO_6$ octahedrons connected to one another (see Patent Literature 2).

Furthermore, as shown in FIG. 2, $TiO_2$(B) is characterized by having a crystal structure having one type of a small tunnel space, due to the skeletal structure established by $TiO_6$ octahedrons connected to one another (see Non-Patent Literature 1).

The crystal structures of the two compounds are very similar to each other, and since the partial structure of $H_2Ti_{12}O_{25}$ coincides with the crystal structure of $TiO_2$(B), the presence of an intergrowth phase having a crystal structure which is intermediate of the two compounds as shown in FIG. 3, has been predicted from a crystallographic viewpoint.

The intergrowth phase as used herein refers to the case in which the X-ray diffraction diagram of the phase yields a pattern that is similar to the diagrams of both $H_2Ti_{12}O_{25}$ and $TiO_2$(B), but the diffraction peak positions do not match with the diffraction peak positions of none of the two compounds, and the phase has a crystal structure which is intermediate of the two compounds, as a mean structure. Thus, the intergrowth phase is not a simple mixture. Actual examples of the intergrowth phase are reported in, for example, titanium dioxide (see Non-Patent Literature 3).

However, in the known production method as described above, which uses $H_2Ti_3O_7$ as a starting material, the presence of the intergrowth phase was not confirmed, and the X-ray diffraction diagram which would serve as a ground indicating the presence of the intergrowth phase, is not known.

CITATION LIST

Patent Literatures

Patent Literature 1: JP-A-2008-117625 ("JP-A" means unexamined published Japanese patent application)
Patent Literature 2: JP-A-2008-255000

Non-Patent Literatures

Non-Patent Literature 1: L. Brohan, R. Marchand, Solid State Ionics, 9-10, 419-424 (1983)
Non-Patent Literature 2: T. P. Feist, P. K. Davies, Journal of Solid State Chemistry, 101, 275-295 (1992)
Non-Patent Literature 3: Y. Takahashi, N. Kijima, J. Akimoto, Chemistry of Materials, 18, 748-752 (2006)

SUMMARY OF INVENTION

Technical Problem

The present invention is to solve the current problems described above, and is contemplated for providing a method of producing a titanium oxide that is important as a lithium secondary battery electrode material expected to demonstrate excellent long-term charge/discharge cycle properties and a high capacity, the method facilitating the production of the titanium oxide of a single phase with a high quality, and for providing a titanium oxide.

Solution to Problem

As a result of conducting extensive studies, the inventors of the present invention have found that single phases of the respective compounds of $H_2Ti_{12}O_{25}$, $TiO_2(B)$, and an intergrowth phase of those two compounds can be produced, through a production method thereof, which comprises the steps of: producing a lithium exchanged material $Li_2Ti_6O_{13}$, from $Na_2Ti_6O_{13}$ as a starting material, by, first, exchanging sodium with lithium; producing a proton exchanged material $H_2Ti_6O_{13}$, by exchanging lithium with a proton; and heat treating the resultant $H_2Ti_6O_{13}$, as a starting material, under the temperature condition from 250° C. to 600° C. The present invention is attained based on the above finding.

That is, the present invention is to provide a titanium oxide, as indicated below, of $H_2Ti_{12}O_{25}$, $TiO_2(B)$, and an intergrowth phase of those two compounds; and to provide a production method thereof.

(1) A method of producing a titanium oxide, comprising the steps of: ion-exchanging a sodium titanium oxide $Na_2Ti_6O_{13}$, to synthesize $Li_2Ti_6O_{13}$; subjecting $Li_2Ti_6O_{13}$ to proton exchange, to give $H_2Ti_6O_{13}$; and subjecting $H_2Ti_6O_{13}$, as a starting material, to a heat treatment.

(2) The method of producing a titanium oxide as described in item (1), wherein the step of ion-exchanging the sodium titanium oxide $Na_2Ti_6O_{13}$ is carried out by applying a lithium ion exchange reaction with a lithium molten salt.

(3) The method of producing a titanium oxide as described in item (2), wherein a heat treatment temperature in the lithium ion exchange with a lithium molten salt is within the range from 30° C. to 500° C.

(4) The method of producing a titanium oxide as described in item (1), wherein the step of proton exchange is carried out by applying a proton exchange reaction with an acidic aqueous solution.

(5) The method of producing a titanium oxide as described in item (4), wherein a heat treatment temperature in the proton exchange reaction with an acidic aqueous solution is within the range from 20° C. to 100° C.

(6) The method of producing a titanium oxide as described in item (1), wherein a temperature in the heat treatment of $H_2Ti_6O_{13}$ is within the range from 250° C. to 600° C.

(7) A titanium oxide produced by the method of producing as described in item (1), which has a crystal structure of an intergrowth structure of a $Na_2Ti_{12}O_{25}$ type tunnel structure and a sodium bronze type structure.

ADVANTAGEOUS EFFECTS OF INVENTION

According to the present invention, novel titanium oxides of $H_2Ti_{12}O_{25}$, $TiO_2(B)$, and an intergrowth phase of those two compounds, can be produced, and a lithium secondary battery can be realized having excellent properties, by using any of those compounds as an active material of the electrode material.

BRIEF DESCRIPTION OF DRAWINGS

FIG. 1 is a schematic diagram showing the crystal structure of a titanium oxide $H_2Ti_{12}O_{25}$, as produced by a production method of the present invention.
FIG. 2 is a schematic diagram showing the crystal structure of a titanium oxide $TiO_2(B)$, as produced by a production method of the present invention.
FIG. 3 is a schematic diagram showing the crystal structure of a titanium oxide having an intergrowth structure, as produced by a production method of the present invention.
FIG. 4 is an X-ray powder diffraction diagram of $H_2Ti_{12}O_{25}$ (Sample A) obtained in Example 1 by a production method of the present invention.
FIG. 5 is an X-ray powder diffraction diagram of $H_2Ti_{12}O_{25}$ (Sample B) obtained in Example 1 by a production method of the present invention.
FIG. 6 is a schematic diagram showing an example of a lithium secondary battery.
FIG. 7 is a graph showing voltage change due to a lithium insertion/extraction reaction in a battery which utilized an electrode produced with, as an active material, the $H_2Ti_{12}O_{25}$ (Sample A) obtained in Example 1 by a production method of the present invention.
FIG. 8 is an X-ray powder diffraction diagram of the intergrowth phase (Sample C) obtained in Example 2 by a production method of the present invention.
FIG. 9 is an X-ray powder diffraction diagram of the intergrowth phase (Sample D) obtained in Example 2 by a production method of the present invention.
FIG. 10 is a diagram showing the difference in the X-ray powder diffraction patterns of the titanium oxides obtained in Examples 1, 2 and 3, each of which was produced by a production method of the present invention.

FIG. 11 is a graph showing voltage change due to a lithium insertion/extraction reaction in a battery which utilized an electrode produced with, as an active material, the intergrowth phase (Sample C) obtained in Example 2 by a production method of the present invention.

FIG. 12 is an X-ray powder diffraction diagram of $TiO_2(B)$ (Sample E) obtained in Example 3 by a production method of the present invention.

FIG. 13 is a diagram showing the X-ray diffraction data for a pulverized product of the $H_2Ti_6O_{13}$ polycrystal synthesized in Example 1, with respect to a temperature range from 30° C. to 650° C.

FIG. 14 is an X-ray powder diffraction diagram of $H_2Ti_{12}O_{25}$ (Sample F) obtained in Comparative example 1.

FIG. 15 is a graph showing voltage change due to a lithium insertion/extraction reaction in a battery which utilized an electrode produced with, as an active material, the $H_2Ti_{12}O_{25}$ (Sample F) obtained in Comparative Example 1.

FIG. 16 is a diagram showing the X-ray diffraction data for a pulverized product of the $H_2Ti_3O_7$ polycrystal obtained in Comparative Example 1, with respect to a temperature range from 30° C. to 440° C.

DESCRIPTION OF EMBODIMENTS

Figure 1:
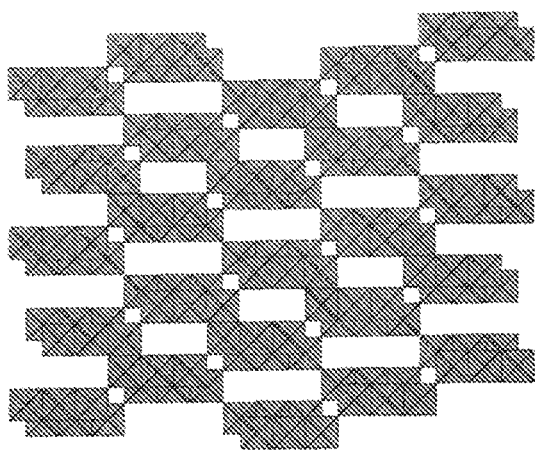
{FIG. 1}
Figure 2:
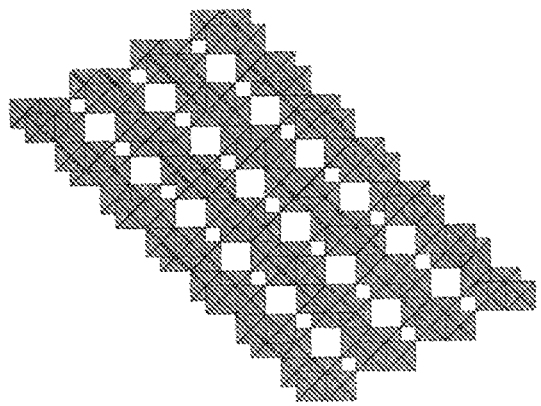
{FIG. 2}
Figure 3:
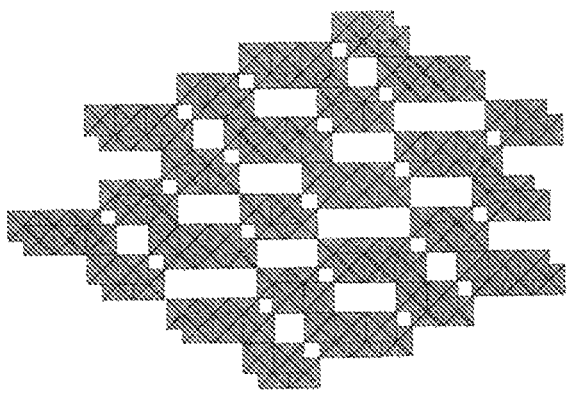
{FIG. 3}

The production method of the present invention is a production process capable of producing a single phase of the respective titanium oxide $H_2Ti_{12}O_{25}$, $TiO_2(B)$, and an intergrowth phase of those two compounds, each of which can be used as a lithium battery electrode active material, and the method is characterized by comprising the steps of: ion-exchanging a sodium titanium oxide $Na_2Ti_6O_{13}$, to synthesize $Li_2Ti_6O_{13}$; subjecting $Li_2Ti_6O_{13}$ to proton exchange, to give $H_2Ti_6O_{13}$; and subjecting $H_2Ti_6O_{13}$, as a starting material, to a heat treatment.

Further, the production method of the present invention is characterized by applying a lithium ion exchange reaction with a lithium molten salt, as a method of ion exchange.

Further, the production method of the present invention is characterized by applying a proton exchange reaction with an acidic aqueous solution, as a method of proton exchange.

Further, the production method of the present invention is characterized in that the heat treatment temperature for $H_2Ti_6O_{13}$ is within the range from 250° C. to 600° C.

The following provides a detailed explanation of the production method according to the present invention.

(Method of Producing $Na_2Ti_6O_{13}$)

In the present invention, $Na_2Ti_3O_7$ polycrystal of a starting material can be produced, by weighing and mixing raw materials of at least one type of sodium compound and at least one type of titanium compound, to give the chemical composition of $Na_2Ti_6O_{13}$, followed by heating the thus-mixed raw materials under an atmosphere containing oxygen gas, such as in the air.

At least one selected from sodium (metal sodium) and sodium compounds is used as the sodium raw material. There are no particular limitations on the sodium compound, as well as it contains sodium, and examples thereof include oxides, such as $Na_2O$ and $Na_2O_2$, salts, such as $Na_2CO_3$ and $NaNO_3$, and hydroxides, such as NaOH. Among these, for example, $Na_2CO_3$ is particularly preferable.

At least one selected from titanium (metal titanium) and titanium compounds is used as the titanium raw material. There are no particular limitations on the titanium compound, as well as it contains titanium, and examples thereof include oxides, such as TiO, $Ti_2O_3$ and $TiO_2$, and salts, such as $TiCl_4$. Among these, for example, $TiO_2$ is particularly preferable.

First, a mixture containing these raw materials is prepared. The sodium raw material and the titanium raw material are preferably mixed such that the mixing ratio thereof corresponds to the chemical composition of $Na_2Ti_6O_{13}$. Since sodium is apt to volatilize in heating, the sodium raw material is preferably charged such that the relative proportion of sodium becomes slightly more excess than the elemental ratio of 2 in the aforementioned chemical formula, and the relative proportion of sodium is more preferably set within a range of 2.0 to 2.1. Further, there are no particular limitations on the mixing method, as well as the raw materials can be uniformly mixed, and the raw materials may be mixed by, for example, a wet method or a dry method using any conventional mixing machine, such as a mixer.

Then, the mixture is subjected to baking by heating. Although the temperature at baking by heating can be suitably set according to the raw materials, it is generally set within a range of about 600° C. to 1,200° C. and is preferably set within a range of 700° C. to 1,050° C. Further, there are no particular limitations on the atmosphere at baking by heating, and the baking by heating is generally carried out in an oxidizing atmosphere or in the air. The baking by heating time period can be suitably changed according to the baking by heating temperature and the like. There are also no particular limitations on the cooling method, but cooling is generally carried out by spontaneous cooling (in-furnace cooling) or slow cooling.

After baking by heating, the thus-baked product may be crushed or pulverized by any conventional method as necessary, and the baking by heating step described above may further be conducted again. Namely, in the method of the present invention, the aforementioned step of subjecting the mixture to baking by heating, cooling, and crushing is preferably repeated two or more times. Furthermore, the degree of crushing is suitably adjusted according to the baking by heating temperature and the like.

(Method of Producing Lithium-Exchanged Material $Li_2Ti_6O_{13}$)

Then, by using the $Na_2Ti_6O_{13}$ obtained as described above as a starting material, to apply a lithium ion exchange reaction in a molten salt containing a lithium compound, a lithium ion-exchanged active material $Li_2Ti_6O_{13}$ is obtained, in which sodium in the starting compound is nearly completely replaced with lithium.

In this case, it is preferable to apply the ion exchange treatment, while dispersing the pulverized $Na_2Ti_6O_{13}$ in a molten salt containing a lithium compound. As the molten salt, use can be made of a molten salt containing any one salt that melts at a relatively low temperature, such as lithium nitrate, lithium chloride, lithium bromide, and lithium iodide. In a preferable method, a lithium salt has been melted in advance, and a $Na_2Ti_6O_{13}$ powder may be introduced therein. The mixing ratio is generally 3 to 100, and preferably 10 to 30, as a proportion of the weight of $Na_2Ti_6O_{13}$ to the total weight of the lithium salt.

The temperature for the ion exchange treatment is in the range of 30° C. to 500° C., and preferably 200° C. to 400° C. The treatment time period is generally 2 to 72 hours, and preferably 5 to 50 hours.

Further, a method of treating the sodium compound in an organic solvent or an aqueous solution, in which the lithium compound is melted, is also suitable as a method of the lithium ion exchange treatment. In this case, a pulverized $Na_2Ti_6O_{13}$ raw material is introduced into an organic solvent or water, in which a lithium compound is dissolved at a certain concentration, and the treatment is carried out at a temperature equal to or lower than the boiling point of the organic solvent or water. In order to avoid evaporation of the solvent, it is preferable to perform ion exchange, while heating the solvent to reflux. The treatment temperature is generally 30° C. to 300° C., and preferably 50° C. to 180° C. Furthermore, the treatment time period is not particularly limited, but is generally 5 to 50 hours, and preferably 10 to 20 hours.

Preferred examples of the lithium compound that can be used in the present invention include a hydroxide, a carbonate, an acetate, a nitrate, an oxalate, a halide, and butyllithium, and these are used singly, or if necessary, in combination of two or more kinds thereof. Furthermore, as the organic solvent that can be used in the present invention, a higher alcohol, such as hexanol or ethoxyethanol; an ether, such as diethyl glycol monoethyl ether; or an organic solvent having a boiling point of 140° C. or higher, is preferred from the viewpoint of satisfactory workability. These are used singly, or if necessary, in combination of two or more kinds thereof.

The concentration of the lithium compound in the organic solvent or aqueous solution is generally 3 to 10 mol %, and preferably 5 to 8 mol %. Furthermore, the dispersion concentration of the $Na_2Ti_6O_{13}$ raw material in the organic solvent or aqueous solution is not particularly limited, but is preferably about 1 to 20 wt %, from the viewpoints of operability and economic efficiency.

After the ion exchange treatment, the product thus obtained is washed with ethanol or the like, followed by drying, thereby to obtain the desired lithium ion-exchanged material represented by the formula: $Li_2Ti_6O_{13}$. There are no particular limitations on the washing method and the drying method, and in addition to the use of usual methods, the product may also be spontaneously dried in a desiccator or the like.

With regard to the $Li_2Ti_6O_{13}$ obtained in this manner, the amount of residual sodium deprived from the starting material can be controlled, by changing the conditions for the exchange treatment, from a chemical composition in which a significant amount of sodium is remained, to a chemical composition in which the amount of sodium is below the detection limit of a chemical analysis according to a wet method.

(Method of Producing Proton-Exchanged Material $H_2Ti_6O_{13}$)

Then, by using the $Li_2Ti_6O_{13}$ obtained as described above as a starting material, to apply a proton exchange reaction in an acidic aqueous solution, a proton-exchanged material $H_2Ti_6O_{13}$ is obtained, in which lithium in the starting compound is nearly completely replaced with hydrogen.

In this case, it is preferable that the crushed $Li_2Ti_6O_{13}$ is dispersed in the acidic solution and is retained therein for a fixed period of time, followed by drying. Examples of the acid to be used include hydrochloric acid, sulfuric acid, and nitric acid at an arbitrary concentration, and an aqueous solution containing at least one of the acid is preferably used. Among these, dilute hydrochloric acid at a concentration of 0.1 to 1.0 N is preferably used. The treatment time period is within a range of 10 hours to 10 days, and is preferably within a range of 1 to 7 days. Further, it is preferable to suitably replace the solution with a fresh solution, so as to shorten the treatment time period. Furthermore, in order to facilitate the progress of the exchange reaction, the treatment temperature is set to be higher than room temperature, and preferably to 30° C. to 100° C. A conventional drying method can be applied for the drying, and, for example, vacuum drying is preferable.

With regard to the $H_2Ti_6O_{13}$ obtained in this manner, by optimizing the conditions of the proton exchange treatment, the amounts of remaining sodium and lithium derived from the starting material can be reduced to not more than the detection limit of a wet chemical analysis method.

(Production Method of Titanium Oxide $H_2Ti_{12}O_{25}$)

The target titanium oxide $H_2Ti_{12}O_{25}$ is obtained, by using, as a starting material, the $H_2Ti_6O_{13}$ polycrystal obtained as described above, and heat-treating the starting material in the air, while accompanying thermal degradation of $H_2O$.

In this case, the temperature of the heat treatment is within a range of 250° C. to 360° C. and is preferably within a range of 260° C. to 330° C. The treatment time period is generally within a range of 0.5 to 100 hours and is preferably within a range of 1 to 30 hours, and the higher the heat treatment temperature is, the shorter the treatment time period can be.

(Method of Producing Intergrowth Phase of $H_2Ti_{12}O_{25}$ and $TiO_2(B)$)

The target intergrowth phase is obtained, by using, as a starting material, the $H_2Ti_6O_{13}$ polycrystal obtained as described above, and heat-treating the starting material in the air, while accompanying thermal degradation of $H_2O$.

In this case, the temperature of the heat treatment is within a range of 280° C. to 500° C. and is preferably within a range of 290° C. to 460° C. The treatment time period is generally within a range of 0.5 to 100 hours and is preferably within a range of 1 to 30 hours, and the higher the heat treatment temperature is, the shorter the treatment time period can be.

(Method of Producing Titanium Oxide $TiO_2(B)$)

The target $TiO_2(B)$ is obtained, by using, as a starting material, the $H_2Ti_6O_{13}$ polycrystal obtained as described above, and heat-treating the starting material in the air, while accompanying thermal degradation of $H_2O$.

In this case, the temperature of the heat treatment is within a range of 400° C. to 600° C. and is preferably within a range of 450° C. to 550° C. The treatment time period is generally within a range of 0.1 to 100 hours and is preferably within a range of 0.3 to 30 hours, and the higher the heat treatment temperature is, the shorter the treatment time period can be.

EXAMPLES

The characteristics of the present invention will be further clarified, based on examples given below, but the invention is not meant to be limited by these.

Example 1

Production Method of $Na_2Ti_6O_{13}$

Sodium carbonate ($Na_2CO_3$) powder having a purity of 99% or more and titanium dioxide ($TiO_2$) powder having a purity of 99.99% or more were weighed to a molar ratio of Na:Ti of 2.02:6. They were mixed in a mortar, and then a JIS-standard platinum crucible was filled therewith, followed by heating in the air under a high-temperature condition with an electric furnace. The baking by heating temperature was 800° C., and the baking by heating time period was 20 hours. Then, after allowing spontaneously cooling in the electric furnace, the thus-baked product was again crushed and mixed in a mortar, followed by baking by heating again for 20 hours at 800° C., thereby to obtain $Na_2Ti_6O_{13}$ polycrystal of a starting material.

The resultant sample was analyzed by ICP emission spectrometry on the chemical composition, to show Na:Ti=2.0:6 (analytical error for each element: within 0.04), and it was considered proper that the chemical composition of the sample was represented by the chemical formula of $Na_2Ti_6O_{13}$. Further, it was confirmed that the sample was consisted of a single phase crystalline structure, which exhibited a monoclinic system with a space group of C2/m, and had satisfactory crystallinity, as determined with an X-ray powder diffraction analyzer. Furthermore, when lattice parameters were determined by the least-squares method using the respective indices and interplanar spacings, the values indicated below were obtained, and these values closely coincided with known values for $Na_2Ti_6O_{13}$:

a=1.5072 nm (error: within 0.0005 nm)
b=0.3738 nm (error: within 0.0001 nm)
c=0.9154 nm (error: within 0.0003 nm)
$\beta$=99.00° (error: within 0.02°)

The thus obtained $Na_2Ti_6O_{13}$ polycrystal was examined on the grain morphology with a scanning electron microscope (SEM), and it was confirmed that the polycrystal was composed of primary particles which had an isotropic shape measuring about 1 micron on a side.

(Method of Producing Ion-Exchanged Material $Li_2Ti_6O_{13}$)

A pulverization product of the $Na_2Ti_6O_{13}$ polycrystal synthesized as described above was used as a starting material, and this pulverization product and an anhydrous lithium nitrate ($LiNO_3$) powder with a purity of 99% or higher were weighed such that the weight ratio of $Na_2Ti_6O_{13}$:$LiNO_3$ was 1:20. These were mixed in a mortar, and then the resultant mixture was placed in an alumina crucible. The crucible was maintained at 380° C. for 10 hours in the air with an electric furnace, and thereby a lithium ion exchange treatment was carried out. Then, the thus-obtained product was thoroughly washed with pure water and ethanol, followed by spontaneously drying, to obtain $Li_2Ti_6O_{13}$.

The resultant sample was analyzed by ICP emission spectrometry on the chemical composition, to show Na:Li:Ti=0.03:1.97:6 (analytical error for each element: within 0.04). The amount of residual sodium was below the analytical error, and it was confirmed that the sample had a composition which contained almost no sodium. Furthermore, it was confirmed by an X-ray powder diffraction analyzer that the resultant sample was consisted of a single phase of $Li_2Ti_6O_{13}$ having a $Na_2Ti_6O_{13}$ type tunnel structure which exhibited a monoclinic system with a space group of C2/m, and had satisfactory crystallinity. Furthermore, when lattice parameters were determined by the least-squares method using the respective indices and interplanar spacings, the values indicated below were obtained, and these values closely coincided with known values for $Li_2Ti_6O_{13}$:

a=1.5334 nm (error: within 0.0003 nm)
b=0.3751 nm (error: within 0.0001 nm)
c=0.9148 nm (error: within 0.0002 nm)
$\beta$=99.44° (error: within 0.01°)

The thus-obtained $Li_2Ti_6O_{13}$ was examined on the grain morphology with a scanning electron microscope (SEM), and it was confirmed that the polycrystal maintained the morphology of the starting material $Na_2Ti_6O_{13}$, and that the polycrystal was composed of primary particles which had an isotropic shape measuring about 1 micron on a side.

(Production Method of Proton Exchanged Material $H_2Ti_6O_{13}$)

The crushed powder of $Li_2Ti_6O_{13}$ synthesized as described above was used as the starting material, and the starting material was subjected to a proton exchange treatment by immersing the starting material in 0.5 N of hydrochloric acid solution and holding for 5 days at 70° C. The solution was replaced in every 12 hours, in order to accelerate the exchange treatment speed. Then, the resultant product was rinsed with water and was dried for 24 hours in the air at 70° C., to obtain a target proton-exchanged material $H_2Ti_6O_{13}$.

The resultant sample was analyzed on the chemical composition by ICP emission spectrometry, to show Na:Li:Ti=0.03:0.08:6 (analytical error for each element: within 0.04). A significant amount of residual lithium was confirmed, but when the residual contents of sodium and lithium were assumed to be composed of proton, the chemical composition was $H_{1.89}Li_{0.08}Na_{0.03}Ti_6O_{13}$. Thus, it was made clear that the target compound was synthesized to a composition very close to $H_2Ti_6O_{13}$. Furthermore, it was confirmed by an X-ray powder diffraction analyzer that the resultant sample was consisted of a single phase of $H_2Ti_6O_{13}$ having a $Na_2Ti_6O_{13}$ type tunnel structure which exhibited a monoclinic system with a space group of C2/m, and had satisfactory crystallinity. Furthermore, when lattice parameters were determined by the least-squares method using the respective indices and interplanar spacings, the values indicated below were obtained, and these values closely coincided with known values for $H_2Ti_6O_{13}$:

a=1.4680 nm (error: within 0.0003 nm)
b=0.3746 nm (error: within 0.0001 nm)
c=0.9261 nm (error: within 0.0001 nm)
$\beta$=96.97° (error: within 0.02°)

The thus-obtained $H_2Ti_6O_{13}$ polycrystal was examined on the grain morphology with a scanning electron microscope (SEM), and it was confirmed that the polycrystal maintained the morphology of the starting material $Na_2Ti_6O_{13}$ or the lithium ion-exchanged material $Li_2Ti_6O_{13}$, and that the polycrystal was composed of primary particles which had an isotropic shape measuring about 1 micron on a side.

Furthermore, with respect to the validity of the chemical composition, a weight loss of 3.7 wt % was confirmed upon heating to 600° C., as a result of thermogravimetric analysis (TGA). This result can be explained with the decomposition reaction indicated below (calculated value: 3.6 wt %); thereby, it was confirmed proper that the chemical composition of the sample was $H_2Ti_6O_{13}$.

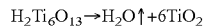

$H_2Ti_6O_{13} \rightarrow H_2O\uparrow + 6TiO_2$ (Production of Titanium Oxide $H_2Ti_{12}O_{25}$)

Then, an alumina crucible was filled with the thus-obtained $H_2Ti_6O_{13}$ polycrystal as the starting material, followed by heat treating at 260° C. for 32 hours in the air (Sample A), or at 300° C. for 7 hours in the air (Sample B). Thus, the target compound, $H_2Ti_{12}O_{25}$, was obtained.

Figure 4:
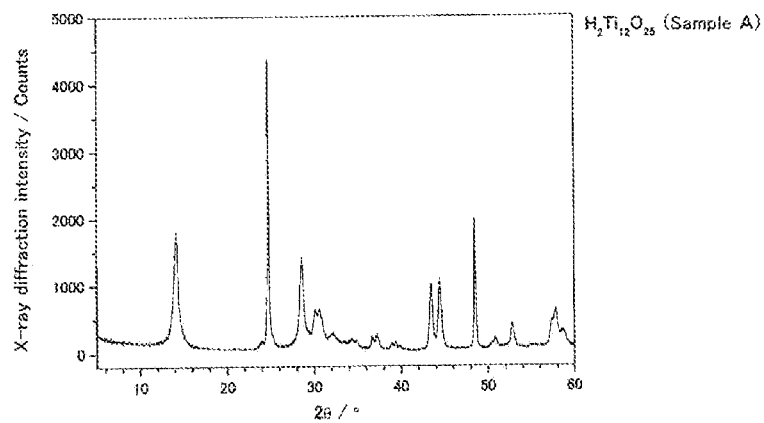
{FIG. 4}
Figure 5:
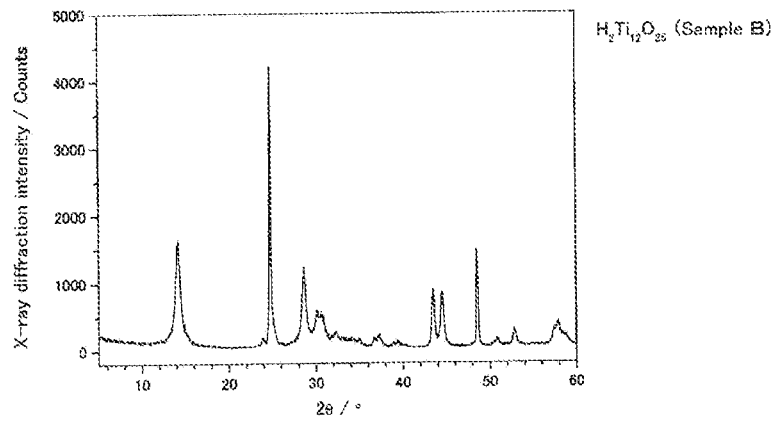
{FIG. 5}

X-ray diffraction data of the resultant samples were measured with an X-ray powder diffraction analyzer, and it was clearly shown that the samples exhibited diffraction diagram characteristic to $H_2Ti_{12}O_{25}$, such as the diagram that had been reported in the past. The powder X-ray diffraction analysis diagrams obtained under the respective synthetic conditions are presented in FIGS. 4 and 5.

Furthermore, with respect to the validity of the chemical composition, a weight loss of 1.7 wt % was confirmed in each of the samples upon heating to 600° C., as a result of thermogravimetric analysis (TGA). This result can be explained with the decomposition reaction indicated below (calculated value: 1.8 wt %); thereby, it was confirmed proper that the chemical composition of the respective sample was $H_2Ti_{12}O_{25}$.

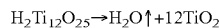

$H_2Ti_{12}O_{25} \rightarrow H_2O\uparrow + 12TiO_2$

When the grain morphology of the respective $H_2Ti_{12}O_{25}$ thus obtained was examined with a scanning electron microscope (SEM), it was confirmed that the respective morphology of the starting material $Na_2Ti_6O_{13}$, the precursor $Li_2Ti_6O_{13}$, and $H_2Ti_6O_{13}$ was maintained, and that the samples each were composed of primary particles which had an isotropic shape measuring about 1 micron on a side.

(Lithium Secondary Battery)

Figure 6:
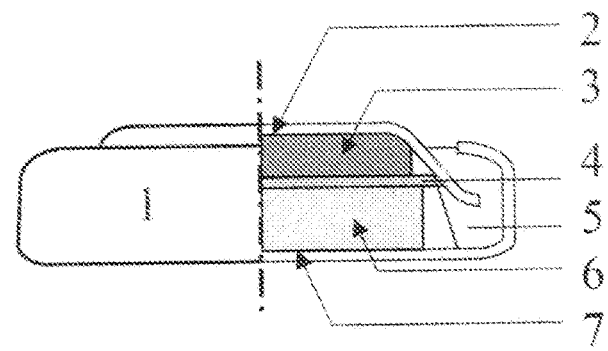
{FIG. 6}

The $H_2Ti_{12}O_{25}$ (Sample A) obtained in this manner was used as an active material, and the active material, an electrical conducting material of acetylene black, and a binder of tetrafluoroethylene were blended at a weight ratio of 10:5:1, to prepare an electrode. Metal lithium was used as a counter electrode, and a 1M solution of lithium hexafluorophosphate dissolved in a mixed solvent of ethylene carbonate (EC) and diethyl carbonate (DEC) (volume ratio=1:1) was used as a liquid electrolyte. A lithium secondary battery (coin-type cell) having the structure as shown in FIG. 6 was produced using these battery elements, and then the electrochemical lithium insertion/extraction behavior thereof was measured electrochemically. The battery was produced in accordance with a conventional cell structuring and assembling method.

Figure 7:
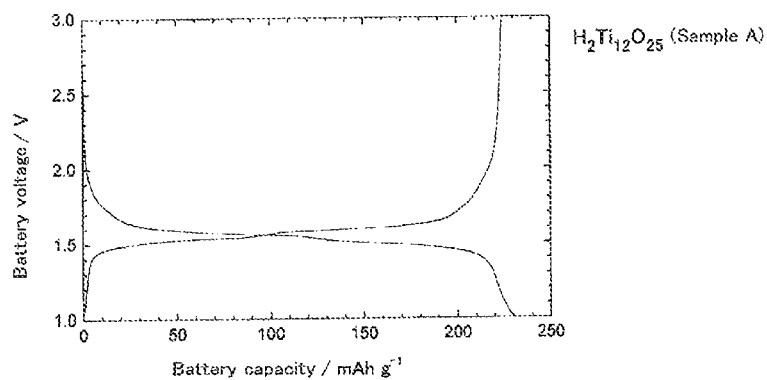
{FIG. 7}

The thus-produced lithium secondary battery was subjected to an electrochemical lithium insertion/extraction test, under a temperature condition of 25° C., at a current density of 10 mA/g, in cutoff potentials between 3.0 V and 1.0 V, and a voltage plateau was observed near 1.6 V; thereby, it was confirmed that reversible lithium insertion and extraction was able to carry out. The voltage change on the second cycle accompanying the lithium insertion/extraction reaction is presented in FIG. 7. The insertion and extraction capacities per weight of the active material were 230 mAh/g and 224 mAh/g, respectively. By comparing these initial characteristics with the past reports, the advantageous features of the production method of the present invention are clearly exhibited that higher capacities are obtained, and that single phase samples of higher quality can be synthesized.

Example 2

Method of Producing Intergrowth Phase of $H_2Ti_{12}O_{25}$ and $TiO_2(B)$)

An alumina crucible was filled with a pulverization product of the $H_2Ti_6O_{13}$ polycrystal synthesized in Example 1 as a starting material, followed by heat treating at 300° C. for 20 hours in the air (Sample C), or at 450° C. for 1 hour in the air (Sample D). Thus, the desired intergrowth phase of $H_2Ti_{12}O_{25}$ and $TiO_2(B)$ was obtained.

Figure 8:
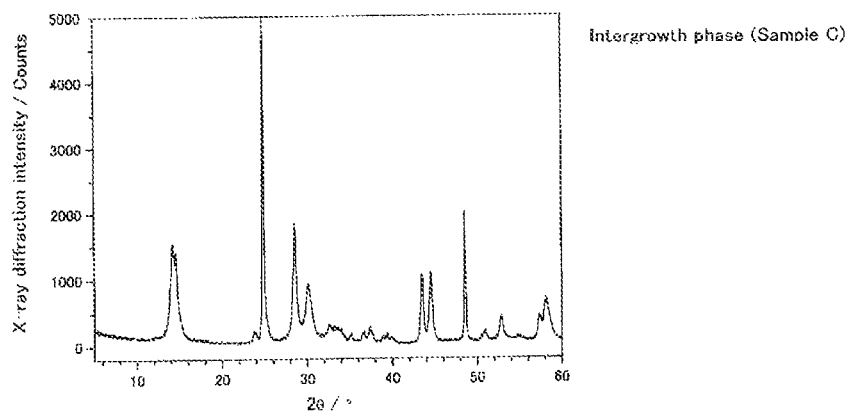
{FIG. 8}
Figure 9:
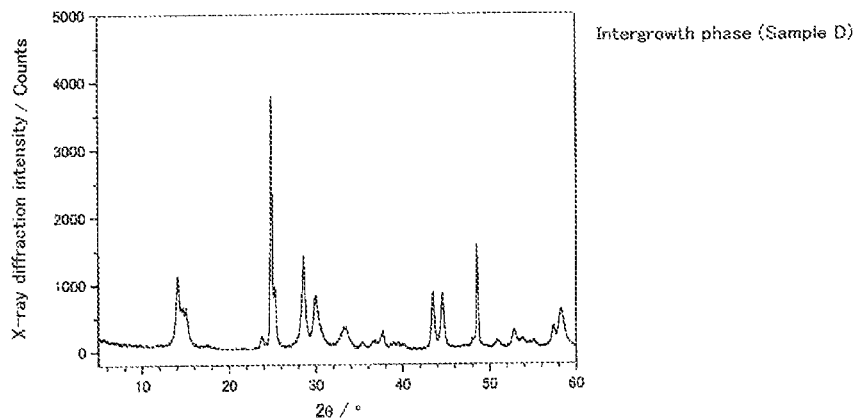
{FIG. 9}
Figure 10:
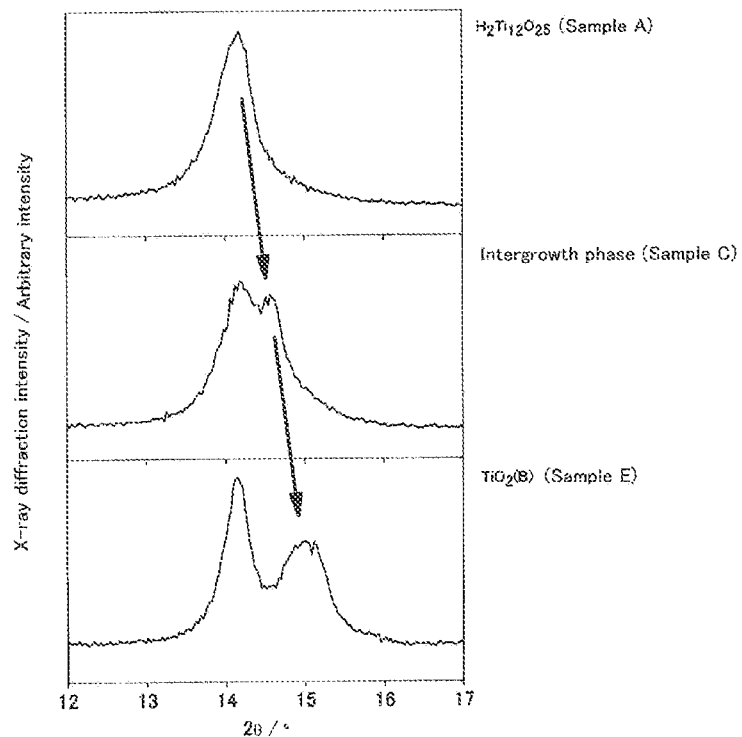
{FIG. 10}

X-ray diffraction data of the resultant samples were measured with an X-ray powder diffraction analyzer, but an obvious shift of the diffraction peak positions was observed, which could not be explained with the X-ray diffraction diagrams of both of $H_2Ti_{12}O_{25}$ and $TiO_2(B)$ that had been previously reported, or with that of a mixture of those compounds. From this result, it was clearly shown that those samples were not mixtures, and each had an intergrowth structure which had a crystal structure intermediate of the structures of those two compounds. The powder X-ray diffraction diagrams of the intergrowth phase are presented in FIGS. 8 and 9, and also, a comparison of the diagrams of $H_2Ti_{12}O_{25}$ and $TiO_2(B)$ with regard to the characteristic diffraction peaks is presented in FIG. 10. In the diagrams, the shift of the peak positions is indicated by arrows.

(Lithium Secondary Battery)

Figure 11:
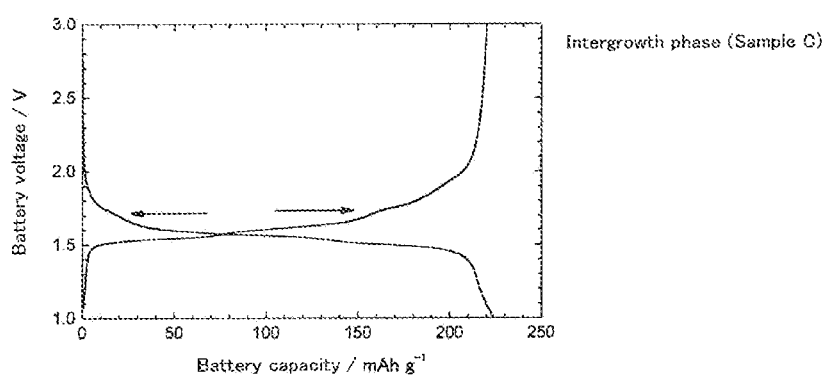
{FIG. 11}

The intergrowth phase (Sample C) thus obtained was used as an active material, an electrode was produced in the same manner as in Example 1, and the lithium secondary battery was produced in the same manner as in Example 1. The resultant lithium secondary battery was subjected to an electrochemical lithium insertion/extraction test under the same condition as in Example 1, and a voltage plateau was observed near 1.6 V; thereby, it was confirmed that reversible lithium insertion and extraction was able to carry out. The voltage change on the second cycle accompanying the lithium insertion/extraction reaction is presented in FIG. 11. The insertion and extraction capacities per weight of the active material were 224 mAh/g and 220 mAh/g, respectively. On the other hand, when a closer look is taken at the discharge curve, it can be seen that steps are present near about 1.7 V in both the insertion curve and the extraction curve, as indicated by arrows in FIG. 11. Such obvious steps are not observed in the discharge curve of $H_2Ti_{12}O_{25}$ in Example 1, and it can be seen that the intergrowth phase exhibits a difference in the lithium insertion position, that is, a difference in the crystal structure between the two phases. Furthermore, with regard to the battery characteristics of the intergrowth phase, when compared with the case of $H_2Ti_{12}O_{25}$ of Example 1, the intergrowth phase has a slightly smaller discharge capacity, but has small irreversibility and has characteristics as a high capacity battery material, so that a sample of high quality can be produced from such a compound. Therefore, the advantageous features of the production method of the present invention are clearly exhibited.

Example 3

Method of Producing $TiO_2(B)$

An alumina crucible was filled with a pulverization product of the $H_2Ti_6O_{13}$ polycrystal synthesized in Example 1 as a starting material, followed by heat treating at 500° C. for 0.5 hours in the air (Sample E). Thus, the desired $TiO_2(B)$ was obtained.

Figure 12:
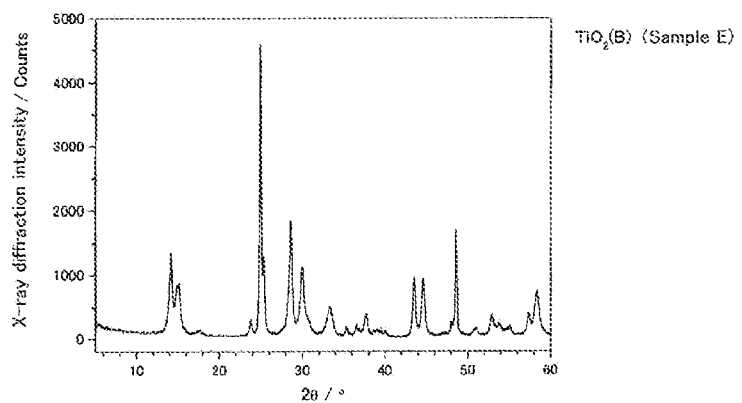
{FIG. 12}

X-ray diffraction data of the resultant sample were measured with an X-ray powder diffraction analyzer, and it was clearly shown that the sample exhibited diffraction diagram characteristic to $TiO_2(B)$, such as the diagram that had been reported in the past. The powder X-ray diffraction analysis diagram thus obtained is presented in FIG. 12.

Example 4

With respect to a pulverization product of the $H_2Ti_6O_{13}$ polycrystal synthesized in Example 1, X-ray diffraction data were measured with a high-temperature powder X-ray diffraction analyzer in a temperature range from 30° C. to 650° C. As a result, it was clearly shown that the phase was a single phase of the $H_2Ti_6O_{13}$ phase, which was the starting material, over the temperature range from 30° C. to around 260° C., but the emergence of the $H_2Ti_{12}O_{25}$ phase over the temperature range from 300° C. to around 330° C., and the structural change over the temperature range from 330° C. to 650° C. until the phase finally changed to the $TiO_2(B)$ phase at near 650° C., occurred continuously along with the peak shifts.

Figure 13:
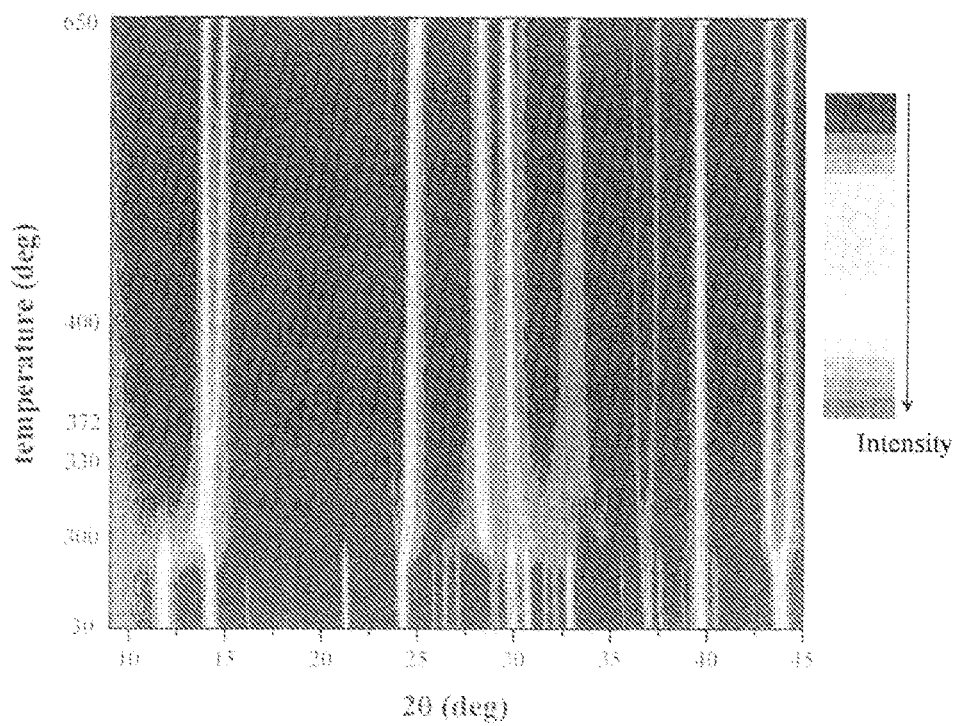
{FIG. 13}

In particular, the peak shifts at 2θ of near 15° and near 23° were remarkable, and in this regard, it was directly confirmed that an intergrowth structure was formed in this temperature range under the temperature rise conditions for the high-temperature powder X-ray diffraction analysis (5° C. per minute) (FIG. 13).

Comparative Example 1

Production Method of $Na_2Ti_3O_7$

Sodium carbonate ($Na_2CO_3$) powder having a purity of 99% or more and titanium dioxide ($TiO_2$) powder having a purity of 99.99% or more were weighed to a molar ratio of Na:Ti of 2:3. They were mixed in a mortar, and then a JIS-standard platinum crucible was filled therewith, followed by heating in the air under a high-temperature condition with an electric furnace. The baking by heating temperature was 800° C., and the baking by heating time period was 20 hours. Then, after allowing spontaneously cooling in the electric furnace, the thus-baked product was again crushed and mixed in a mortar, followed by baking by heating again for 20 hours at 800° C., thereby to obtain $Na_2Ti_3O_7$ of a starting material.

The resultant sample was analyzed by ICP emission spectrometry on the chemical composition, to show Na:Ti=2.01:3.00 (analytical error for each element: within 0.04), and it was considered proper that the chemical composition of the sample was represented by the chemical formula of $Na_2Ti_3O_7$. Further, it was confirmed that the sample was consisted of a single phase crystalline structure, which exhibited a monoclinic system with a space group of $P2_1/m$, and had satisfactory crystallinity, as determined with an X-ray powder diffraction analyzer. Furthermore, when lattice parameters were determined by the least-squares method using the respective indices and interplanar spacings, the values indicated below were obtained, and these values closely coincided with known values for $Na_2Ti_3O_7$:
a=0.9131 nm (error: within 0.0001 nm)
b=0.3804 nm (error: within 0.0001 nm)
c=0.8569 nm (error: within 0.0001 nm)
β=101.60° (error: within 0.01°)
(Production Method of $H_2Ti_3O_7$)

The crushed powder of $Na_2Ti_3O_7$ polycrystal synthesized as described above was used as the starting material, and the starting material was subjected to a proton exchange treatment by immersing the starting material in 0.5 N of hydrochloric acid solution and holding for 5 days at 70° C. The solution was replaced in every 12 hours, in order to accelerate the exchange treatment speed. Then, the resultant product was rinsed with water and was dried for 24 hours in the air at 70° C., to obtain a proton-exchanged material $H_2Ti_3O_7$.

The chemical composition of the sample thus obtained was analyzed by ICP emission spectrometry. Sodium was not detected, and it was confirmed proper that the chemical composition of the sample was represented by the chemical formula of $H_2Ti_3O_7$, in which sodium had been nearly completely replaced with proton. Furthermore, it was confirmed by an X-ray powder diffraction analyzer that the resultant sample was consisted of a single phase of $H_2Ti_3O_7$ of a crystalline structure, which exhibited a monoclinic system with a space group of C2/m, and which had satisfactory crystallinity. Furthermore, when lattice parameters were determined by the least-squares method using the respective indices and interplanar spacings, the values indicated below were obtained, and these values closely coincided with known values for $H_2Ti_3O_7$:
a=1.6510 nm (error: within 0.0001 nm)
b=0.3861 nm (error: within 0.0001 nm)
c=0.9466 nm (error: within 0.0001 nm)
β=101.45° (error: within 0.01°)

When the grain morphology of the thus-obtained $H_2Ti_3O_7$ was examined with a scanning electron microscope (SEM), it was confirmed that the polycrystal maintained the morphology of the starting material $Na_2Ti_3O_7$, and the polycrystal was composed of primary particles which had an isotropic shape measuring about 1 micron on a side.

Then, the resultant $H_2Ti_3O_7$ was heat-treated in the air for 3.75 hours at 260° C., to obtain $H_2Ti_{12}O_{25}$ (Sample F).

Figure 14:
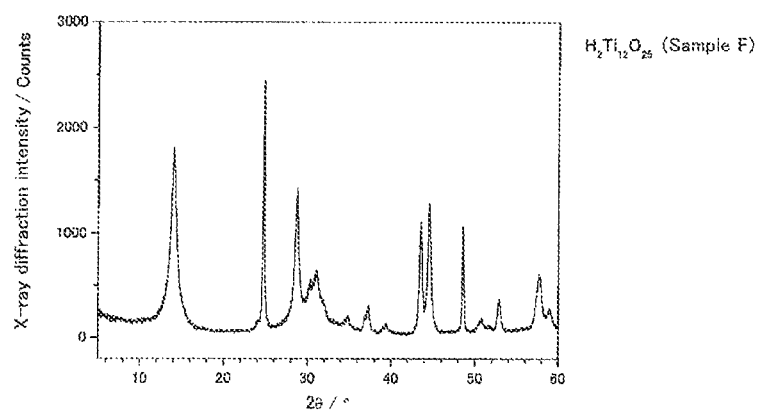
{FIG. 14}

X-ray diffraction data of the resultant sample were measured with an X-ray powder diffraction analyzer, and it was clearly shown that the sample exhibited diffraction diagram characteristic to $H_2Ti_{12}O_{25}$, such as the diagram that had been reported in the past. The powder X-ray diffraction analysis diagram thus obtained is presented in FIG. 14.
(Lithium Secondary Battery)

Figure 15:
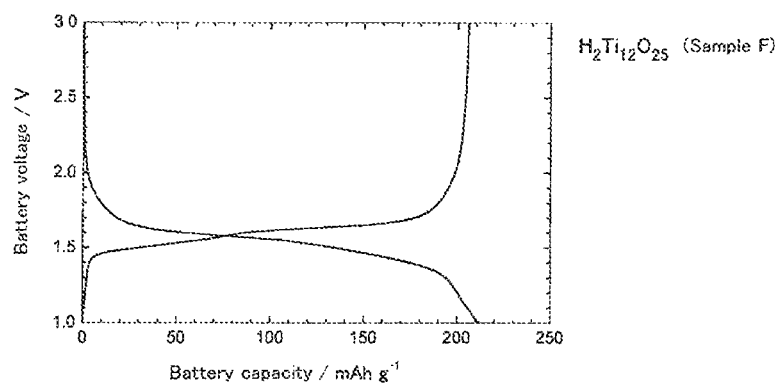
{FIG. 15}

The $H_2Ti_{12}O_{25}$ (Sample F) thus obtained was used as an active material, an electrode was produced in the same manner as in Example 1, and the lithium secondary battery was produced in the same manner as in Example 1. The resultant lithium secondary battery was subjected to an electrochemical lithium insertion/extraction test under the same condition as in Example 1, and a voltage plateau was observed near 1.6 V; thereby, it was confirmed that reversible lithium insertion and extraction was able to carry out. The voltage change on the second cycle accompanying the lithium insertion/extraction reaction is presented in FIG. 15. The insertion and extraction capacities per weight of the active material were 212 mAh/g and 206 mAh/g, respectively, and when compared with Example 1, it was determined that the respective capacities were smaller by about 18 mAh/g. From the above, it is made apparent that a higher capacity is obtained by the production method of the present invention using $H_2Ti_6O_{13}$ as the starting material. Thus, the advantages of the production method of the present invention are made apparent.

Comparative Example 2

Figure 16:
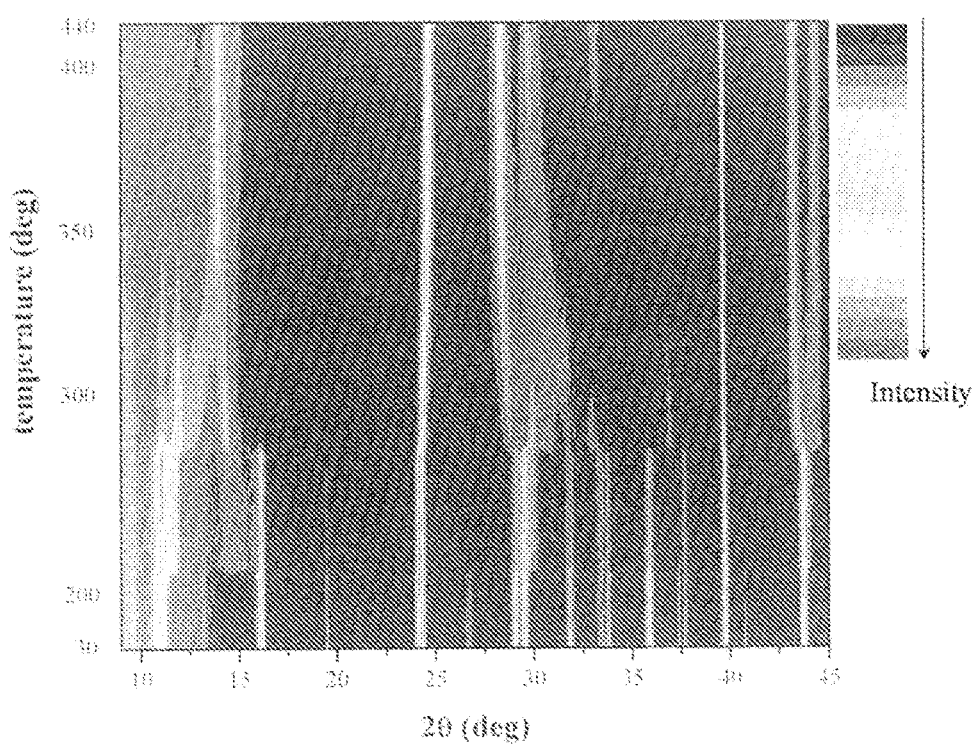
{FIG. 16}

With respect to a pulverization product of the $H_2Ti_3O_7$ polycrystal synthesized in Comparative example 1, X-ray diffraction data were measured with a high-temperature powder X-ray diffraction analyzer in a temperature range from 30° C. to 440° C. As a result, it was clearly shown that the phase was a single phase of the $H_2Ti_3O_7$ phase, which was the starting material, over the temperature range from 30° C. to around 220° C., the $H_2Ti_3O_7$ phase and the $H_2Ti_6O_{13}$ phase were co-present over the temperature range from around 220° C. to around 260° C., and three phases combining the aforementioned two phases with the $H_2Ti_{12}O_{25}$ phase were co-present up to near 340° C. (FIG. 16). Therefore, when compared with Example 4, in the synthesis of $H_2Ti_{12}O_{25}$ using $H_2Ti_3O_7$ as the starting material, it is necessary to control the synthesis conditions very precisely, and from the viewpoints of the readiness of synthesis, the superiority of the present invention is apparent.

On the other hand, under the temperature rise conditions (5° C. per minute) for the high-temperature powder X-ray diffraction analysis, the emergence of the intergrowth phase was not clear as compared with Example 4 over the temperature range up to 440° C., and it is apparent that the synthesis of the intergrowth phase is difficult in the production method using $H_2Ti_3O_7$ as the starting material.
Industrial Applicability The method of producing a titanium oxide, using $H_2Ti_6O_{13}$ as a starting material, according to the present invention, is a production process capable of obtaining single phase compounds of high quality. Since a lithium battery using an electrode containing the titanium oxide as an active material can attain a higher capacity as compared with a titanium oxide produced by a production method using $H_2Ti_3O_7$ as a starting material, the production method of the present invention is higher in the practical values as a production method of a lithium secondary battery negative electrode material oxide.

Furthermore, since the production method of the present invention does not require special apparatuses and the raw materials to be used are inexpensive, high-value-added materials can be produced at low costs.

Reference Signs List
1 Coin-type lithium secondary battery
2 Negative electrode terminal
3 Negative electrode
4 Separator+electrolyte
5 Insulating packing
6 Positive electrode
7 Positive electrode can

The invention claimed is:

1. A method of producing a titanium-containing oxide, comprising the steps of: ion-exchanging a sodium-containing and titanium-containing oxide $Na_2Ti_6O_{13}$; to synthesize $Li_2Ti_6O_{13}$; subjecting $Li_2Ti_6O_{13}$ to proton exchange, to give $H_2Ti_6O_{13}$; and subjecting $H_2Ti_6O_{13}$, as a starting material, to a heat treatment.

2. The method of producing a titanium-containing oxide according to claim 1, wherein the step of ion-exchanging the sodium-containing and titanium-containing oxide $Na_2Ti_6O_{13}$ is carried out by applying a lithium ion exchange reaction with a lithium molten salt.

3. The method of producing a titanium-containing oxide according to claim 2, wherein a heat treatment temperature in the lithium ion exchange with a lithium molten salt is within the range from 30° C. to 500° C.

4. The method of producing a titanium-containing oxide according to claim 1, wherein the step of proton exchange is carried out by applying a proton exchange reaction with an acidic aqueous solution.

5. The method of producing a titanium-containing oxide according to claim 4, wherein a heat treatment temperature in the proton exchange reaction with an acidic aqueous solution is within the range from 20° C. to 100° C.

6. The method of producing a titanium-containing oxide according to claim 1, wherein a temperature in the heat treatment of $H_2Ti_6O_{13}$ is within the range from 250° C. to 600° C.

7. A titanium-containing oxide produced by the method of producing according to claim 1, which has a crystal structure of an intergrowth structure of a $Na_2Ti_{12}O_{25}$ tunnel structure and a sodium bronze structure.

* * * * *